United States Patent [19]
Shelander et al.

[11] Patent Number: 5,826,419
[45] Date of Patent: Oct. 27, 1998

[54] APPARATUS AND METHOD FOR MANUFACTURING FIBER OPTIC CABLE

[75] Inventors: Daniel Louis Shelander, Hickory, N.C.; John Theodore Marcelissen, Beaconfield, Canada

[73] Assignee: Tensor Machinery, Ltd., Quebec, Canada

[21] Appl. No.: 795,813

[22] Filed: Feb. 5, 1997

Related U.S. Application Data

[60] Provisional application No. 60/011,108 Feb. 5, 1997.

[51] Int. Cl. [6] ................................................. D02G 3/36
[52] U.S. Cl. .......................... 57/6; 57/11; 57/13; 57/15; 57/16; 57/18; 57/293
[58] Field of Search .................................. 57/3, 6, 9, 10, 57/11, 13, 14, 15, 16, 17, 18, 293, 294

[56] References Cited

U.S. PATENT DOCUMENTS

| | | | |
|---|---|---|---|
| 3,675,409 | 7/1972 | Rosenstein | 57/15 |
| 4,002,011 | 1/1977 | Tanaka et al. | 57/293 |
| 4,195,468 | 4/1980 | King et al. | 57/9 |
| 4,248,035 | 2/1981 | Skillen et al. | 57/6 |
| 4,309,866 | 1/1982 | Fombellida | 57/15 |
| 4,325,212 | 4/1982 | Hope nee Swiecicki | 57/15 |
| 4,359,857 | 11/1982 | Oestreich | 57/18 |
| 4,395,869 | 8/1983 | Priaroggia et al. | 57/13 |
| 4,470,248 | 9/1984 | Nortenius | 57/6 |
| 4,483,134 | 11/1984 | McKay et al. | 57/9 |
| 4,612,759 | 9/1986 | Meijer | 57/3 |
| 4,619,107 | 10/1986 | Missout et al. | 57/6 |
| 4,663,926 | 5/1987 | Girardon et al. | 57/6 |
| 4,706,449 | 11/1987 | Akre | 57/6 |
| 5,259,180 | 11/1993 | Nortenius | 57/293 |
| 5,315,813 | 5/1994 | Ito et al. | 57/6 |
| 5,325,659 | 7/1994 | Nortenius | 57/293 |
| 5,372,757 | 12/1994 | Schneider | 264/1.28 |
| 5,626,010 | 5/1997 | Loczenski | 57/294 |
| 5,644,905 | 7/1997 | Luthhardt | 57/314 |

FOREIGN PATENT DOCUMENTS

| | | |
|---|---|---|
| 0 458 769 A1 | 11/1991 | European Pat. Off. . |
| 3817398 | 11/1989 | Germany ............... 57/293 |
| 54-11342 | 1/1979 | Japan ..................... 57/16 |
| 2 014 939 A | 9/1979 | United Kingdom . |

*Primary Examiner*—William Stryjewski
*Attorney, Agent, or Firm*—Bell Seltzer Intellecutal Property Law Group of Alston & Bird, LLP

[57] ABSTRACT

An apparatus and method for manufacturing fiber optic cable having a plurality of optical fiber buffer tubes bound by a binder is provided. The apparatus includes a frame and an oscillator shaft support on the frame for oscillating movement about a longitudinal axis. A lay plate is carried by the oscillator shaft and has a plurality of openings for receiving and guiding longitudinally advancing buffer tubes into an oscillating lay about the axis. First and second longitudinally offset binder heads are mounted for rotation about the axis for winding respective binders around the buffer tubes. Both binder heads are concentric with and surround the oscillator shaft such that the closing point for the buffer tubes is downstream of the binder heads and closely adjacent to a locking capstan. The rotatably supported ends of the binder heads are positioned adjacent to each other which allows improved replacement of binder reels. The apparatus may also include third and fourth binder heads for winding additional binders around the buffer tubes.

38 Claims, 5 Drawing Sheets

APPARATUS AND METHOD FOR MANUFACTURING FIBER OPTIC CABLE

CROSS REFERENCE TO RELATED APPLICATIONS

This application is related to commonly owned copending Provisional Application Ser. No. 60/011,108 filed Feb. 5, 1997, and claims the benefit of its earlier filing date under 35 U.S.C. § 119(e).

FIELD OF THE INVENTION

The present invention relates to manufacturing fiber optic cable, and more particularly relates to apparatus and methods for winding binder material around the fiber optic cable.

BACKGROUND OF THE INVENTION

Fiber optic cable includes many optical fibers held together in a way which protects the fibers from physical damage. The optical fibers are typically encased in protective buffer tubes which are formed of a flexible plastic material and may be color coded for ease of installation. Fiber optic cable also often includes a central reinforcing member about which the buffer tubes are arranged to provide strength to the cable. After the buffer tubes have been positioned around the central reinforcing member, a pair of yarn-like binders are wound around the buffer tubes to retain the buffer tubes in position against one another and the central reinforcing member. A plastic sheath or jacket is then provided over the binder and buffer tubes for added protection.

Conventional winding techniques for helically winding buffer tubes around the central reinforcing member suffered from limited line speeds because of the large machine forces associated with orbiting individual buffer tube supply reels around the central reinforcing member. As such, the fiber optic cable manufacturing industry has found it advantageous to arrange the buffer tubes around the central reinforcing member using a reverse oscillating lay technique. The buffer tubes are provided from non-orbiting supply sources and advanced in a direction generally parallel to the central reinforcing member. One or more lay plates are provided having a central opening for the central reinforcing member and a plurality of radially spaced openings for the respective buffer tubes. The lay plates are rotated in a predetermined oscillating fashion about the central reinforcing member. From the most downstream lay plate, the buffer tubes converge towards the central reinforcing member at a closing point and are laid against the central reinforcing member in an oscillating lay. This technique is also known as "S–Z" stranding in reference to the appearance of the oscillated buffer tubes once engaged against the central reinforcing member.

Figures 1, 2, 3:
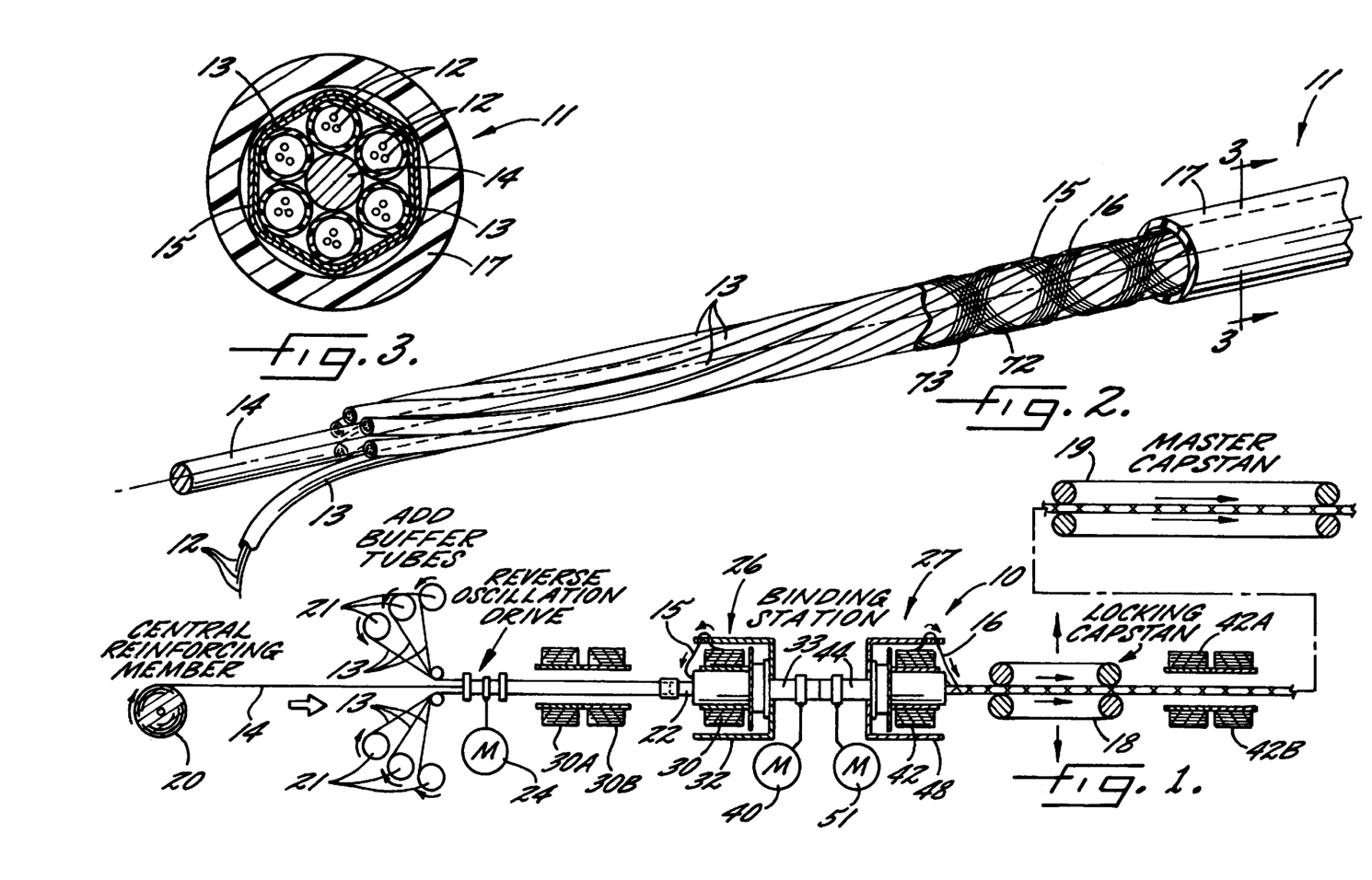
FIG. 1 is a schematic view of a fiber optic cable manufacturing apparatus according to the present invention.
FIG. 2 is a cutaway perspective view of a fiber optic cable manufactured according to the present invention.
FIG. 3 is an enlarged sectional view of the cable illustrated in FIG. 2 and taken along lines 3—3.

The buffer tubes and central reinforcing member are then typically advanced through a hollow concentric binder head where the binder is wound around the buffer tubes. A second binder head may optionally be positioned downstream of the first binder head for winding a second binder around the buffer tubes in an opposite direction. A binder head of this type is illustrated in U.S. Pat. No. 4,325,212 to Hope nee Swiecicki. As illustrated in FIG. 2, the binder head includes a binder reel rotatably supported on a hollow shaft which surrounds the fiber optic cable. The shaft is supported at its downstream end on bearings and has an upstream free end. As the reel is rotated, one or more binder guides pay out the binder over the free end of the shaft so that it can be wound around the buffer tubes. A capstan is typically provided downstream of the binder heads for pulling the fiber optic cable through the apparatus.

A spare binder reel is disposed around the buffer tubes and generally adjacent to the free end of the binder shaft. As such, when the first binder reel has been expended, the empty reel core is removed and the spare binder reel is advanced over the free end of the hollow shaft to the position occupied by the prior reel. This configuration allows the binder to be resupplied without cutting the fiber optic cable.

Conventional cable manufacturing apparatus suffers from several problems, however, which limit efficiency and productivity. One common problem is "cable rocking" between the last lay plate and the capstan. In particular, the twist imparted to the converging buffer tubes by the lay plate causes the entire cable, including the central reinforcing member, to rotate back and forth about its own axis in the region between the last lay plate and the capstan. Cable rocking can cause difficulties in creating the proper oscillating lay for the buffer tubes and may prevent the binder from properly binding the buffer tubes. As would be appreciated, the cable rocking problem is exacerbated as the distance between the last lay plate and the capstan is increased.

One proposed cable manufacturing apparatus includes two conventional binder heads, each having a supported end and a free end. The upstream binder head is supported at its upstream end and the downstream binder head is supported at its downstream end. As a consequence, the binders of both binder heads are wound around the fiber optic cable in the free space between the respective free ends of the binder heads. An oscillating lay plate is extended through the upstream binder head so that the buffer tubes close at a point between the binder heads. The binders are then wound around the buffer tubes and the cable is advanced through the downstream binder head to a capstan.

Another proposed cable manufacturing apparatus includes four consecutive binder heads. The first and second upstream binder heads face each other and are arranged as described above wherein the binders are wound around the buffer tubes between the adjacent free ends of the binder heads. The fiber optic cable is then engaged by a capstan and advanced to third and fourth binder heads downstream of the capstan where third and fourth binders are wound around the fiber optic cable.

Inherent in both of these approaches, however, is limited flexibility in replacing spent binder reels. More specifically, the binder heads are configured such that the free ends of the respective shafts are facing each other and, as such, any replacement binder reels must be positioned in the space between the pairs of binder heads. The free space between the binder heads limits the number of replacement binder reels which can be positioned therein and may make it difficult to obtain access for replacing the reels.

As such, cable manufacturing apparatus suffers from a couple of disadvantages which may limit productivity. First, problems associated with cable rocking by the last lay plate can decrease efficiency and product quality. Second, the cable manufacturing apparatus can be limited in terms of the ability to allow replacement of the binder reels once the binder has been fully expended.

SUMMARY OF THE INVENTION

These and other disadvantages are overcome by the cable manufacturing apparatus and method according to the present invention. In a preferred embodiment, the apparatus includes an oscillator shaft which extends through both of a pair of binder heads. The oscillator shaft carries a lay plate which forms a closing point for the buffer tubes downstream of both of the binder heads. A locking capstan can thus be positioned closely adjacent to the closing point which eliminates or greatly minimizes the cable rocking problem. The limited distance between the closing point and the locking capstan decreases the degree of twist the cable can experience in response to the oscillating buffer tubes.

In addition, both binder heads have rotatably supported shafts which are arranged such that the free ends of the shafts are opposite each other. Several replacement binder reels can be positioned adjacent to the free ends of the binder shafts and, as a result, longer continuous lengths of fiber optic cable can be produced without having to cut the cable to add more binder reels. In another preferred embodiment, a second pair of binder heads is positioned downstream of the first pair of binder heads for winding additional binder around the fiber optic cable.

More particularly, the apparatus according to the present invention includes a frame and an oscillator shaft supported on the frame for oscillating movement about a longitudinal axis. A lay plate is carried by the oscillator shaft for oscillating movement therewith and the lay plate has a plurality of openings for receiving and guiding the longitudinally advancing buffer tubes into an oscillating lay about the axis. The apparatus further includes a first binder head for winding a first binder around the buffer tubes which comprises a binder shaft concentric with and surrounding the oscillator shaft. The binder shaft has a rotatably supported downstream end and an upstream free end. A binder reel having a supply of binder wound thereon is supported on the binder shaft and a binder guide is supported on the binder shaft adjacent to the free end thereof for paying out the binder from the binder reel.

A second binder head is longitudinally offset from the first binder head for winding a second binder around the buffer tubes. The second binder head also includes a binder shaft concentric with and surrounding the oscillator shaft. The binder shaft of the second binder head has a rotatably supported upstream end and a downstream free end and includes a binder reel and a binder guide adjacent the free end of the binder shaft for paying out binder from the binder reel.

The oscillator shaft has an upstream end supported on the frame and an opposite end. The lay plate is mounted to the opposite end of the shaft and is positioned closely adjacent to the second binder head. In a preferred embodiment, the buffer tubes are guidingly converged towards a closing point by the lay plate, the closing point being located downstream of the lay plate and also advantageously downstream of the first and second binder heads. A plurality of conduits associated with the oscillator shaft pass through both the first and second binder heads for guiding the respective longitudinally advancing buffer tubes. The oscillator shaft further includes an upstream end member which is positioned closely adjacent to the first binder head and which has a plurality of openings corresponding to the openings of the lay plate. The individual conduits are formed of tubular members which are engaged at one end in the openings of the lay plate and at the other end in the openings of the upstream end plate. The oscillator shaft advantageously further includes a central hub which defines a bore through which a central reinforcing member for the fiber optic cable is advanced.

The apparatus also advantageously includes a rotatable sleeve surrounding the oscillator shaft and extending longitudinally through the first and second binder heads. A longitudinally extending binder passageway is associated with the rotatable sleeve for guiding the first binder through the binder shaft. The binder passageway has an entrance end adjacent the free end of the first binder shaft for receiving binder from the binder guide, and an exit end for advancing the binder towards wound engagement with the buffer tubes. The binder passageway may comprise a tubular member adhered to the radially outer surface of the sleeve. The rotatable sleeve preferably has one end fixably mounted within the first binder head for rotation therewith and an opposite end freely rotatable within the second binder head. Both ends of the sleeve are rotatably connected to the oscillator shaft with rolling element bearings.

According to another embodiment of the invention, a third binder head is positioned downstream of the second binder head for winding a binder on the buffer tubes and a fourth binder head is positioned downstream of the third binder head for winding a fourth binder around the buffer tubes. A capstan is advantageously positioned downstream of the binder heads for pulling the bound buffer tubes and advancing the buffer tubes through the bores of all four of the binder heads. All four binder heads are rotated at the same speed and are spaced a predetermined distance apart so as to wind the respective binders in a predetermined pattern relative to each other around the buffer tubes. Two of the binder heads are rotated in one direction and are spaced a predetermined distance apart to define two helically extending paths around the buffer tubes which are substantially parallel and equally spaced. The other two of the binder heads are rotated in the opposite direction and are spaced a predetermined distance apart to define two helically extending paths around the buffer tubes which are also substantially parallel and equally spaced.

An associated method of manufacturing fiber optic cable also forms a part of the invention and includes the steps of guiding a plurality of optical fiber buffer tubes into an array spaced about a common axis. The buffer tubes are longitudinally advanced through a first binder head for winding a first binder around the buffer tubes and longitudinally advanced through a second binder head for winding a second binder around the buffer tubes. The buffer tubes are then guided in respective converging directions towards the common axis to define a closing point while oscillating the buffer tubes around the common axis. First and second binders are then wound around the thus closed buffer tubes to bind the buffer tubes together. Advantageously, the first binder is advanced in the same direction as the buffer tubes through the first and second binder heads.

BRIEF DESCRIPTION OF THE DRAWINGS

Some of the features and advantages of the invention having been described, others will become apparent from the detailed description which follows and from the accompanying drawings, which are not necessarily drawn to scale.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A cable manufacturing apparatus 10 according to the present invention is illustrated in FIG. 1. The apparatus 10 is used to manufacture a fiber optic cable 11 of the type illustrated in FIGS. 2 and 3. The individual optical fibers 12 are typically formed of glass or other light-transmitting material and thus can be quite fragile. Accordingly, one or more optical fibers are encased in several protective buffer tubes 13. The buffer tubes 13 are formed of a flexible plastic material and may be color coded for ease of installation.

The fiber optic cable 11 also often includes a central reinforcing member 14 about which the buffer tubes 13 are arranged to provide strength to the cable. At least one pair of counterrotating yarn-like binders 15, 16 is wound around the buffer tubes 13 to retain the buffer tubes in position against the other buffer tubes and the central reinforcing member 14. One preferred binder material is multifilament untwisted polyester yarn, although other binder materials could be used including other yarn types or tape. A plastic sheath or jacket 17 is then provided over the binders 15, 16 and buffer tubes 13 for added protection.

As shown in FIG. 1, the central reinforcing member 14 is unwound from a supply spool 20 and advanced towards the apparatus 10. Several buffer tubes 13 are advanced from respective supply spools 21 into a spaced arrangement with the central reinforcing member 14. The central reinforcing member 14 and buffer tubes 13 are then advanced to the binding apparatus 10 according to the present invention. A locking capstan 18 is positioned at a downstream end of the apparatus 10 for preventing rotation of the fiber optic cable about its own axis. The locking capstan 18 is movable away from the fiber optic cable 11 as shown to allow the replacement of binder reels, as discussed more fully below. A master capstan 19 downstream of the locking capstan is provided for pulling the bound buffer tubes 13 and advancing them through the apparatus.

Figure 4:
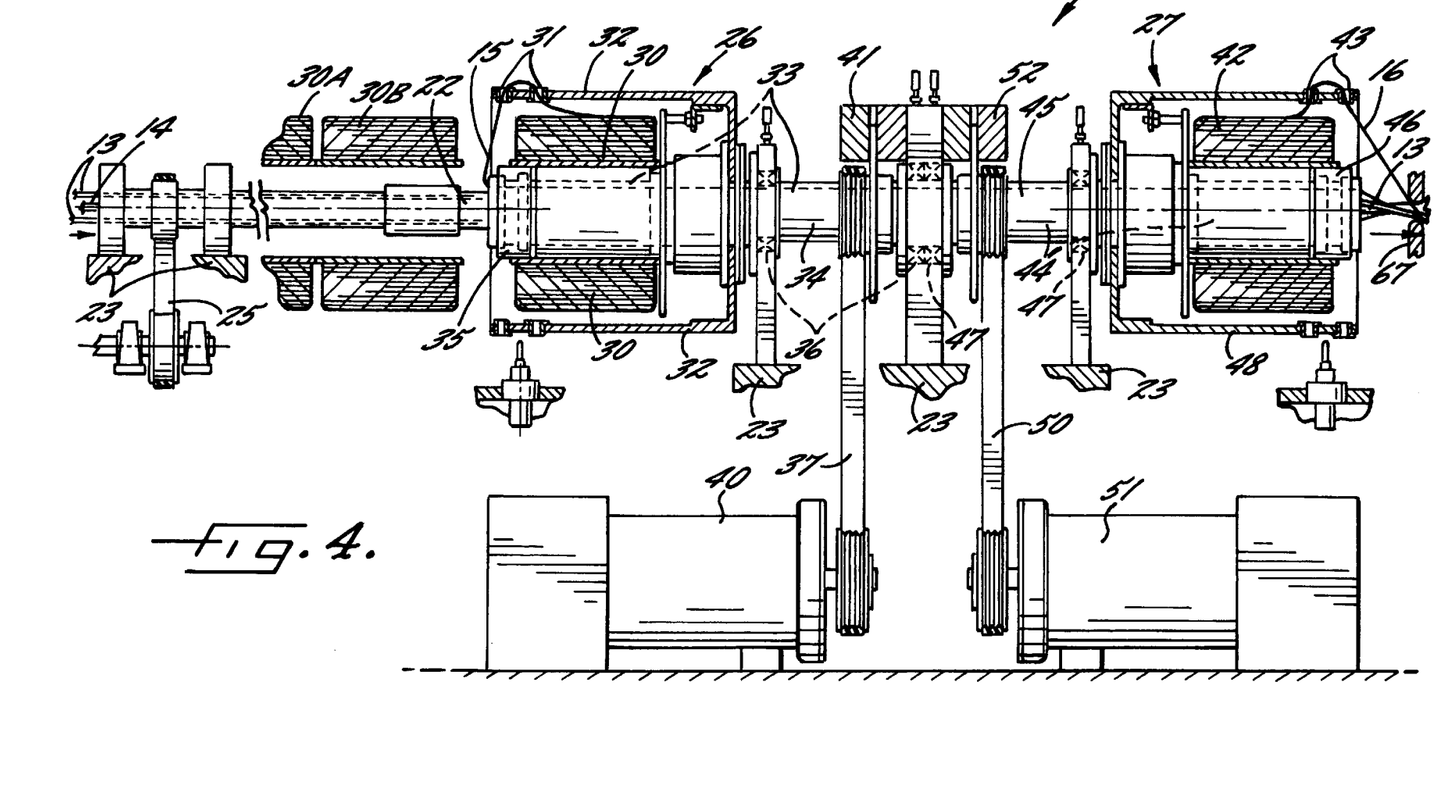
FIG. 4 is a partially sectional side elevation of first and second binder heads according to the invention.

As can be seen in FIG. 4, the buffer tubes 13 and central reinforcing member 14 are received by an oscillator shaft 22 which is mounted for oscillating movement on a frame 23. An oscillating drive motor 24 advances a drive belt 25 in alternating directions to oscillate the oscillator shaft 22. The oscillator shaft 22 extends through first and second binder heads 26, 27 which advance the first and second binders 15, 16 for winding around the buffer tubes 13.

The first binder head 26 has a binder reel 30 having a supply of binder 15 wound thereon. The first binder head 26 also includes a pair of binder guides 31 which are supported on a binder head housing 32. The binder guides 31 are preferably formed of a long-wearing ceramic material and include adjacent inwardly and outwardly facing guides so that the first binder 15 can be threaded in a manner illustrated in FIG. 4. The first binder reel 30 is supported on a binder shaft 33 which is in turn supported on the frame 23. The first binder shaft 33 has a downstream end 34 rotatably supported on the frame 23 and an opposite upstream free end 35. The downstream supported end 34 advantageously is supported on a pair of bearings 36. It will be appreciated that the first binder 15 must be passed over the free end 35 of the binder shaft 33 so that it may be wound around the buffer tubes 13. If the binder 15 was advanced over the opposite supported end 34, the frame 23 or other supporting structure would prevent the binder from completing a full revolution around the buffer tubes 13. The binder shaft 33 is driven by a drive belt 37 and drive motor 40. A brake 41 is also provided for braking the rotation of the binder shaft 33 in emergencies.

The second binder head 27 also includes a binder reel 42 having a supply of binder 16 wound thereon and a pair of binder guides 43 supported on a second binder head housing 48 such that the second binder 16 can be threaded in the manner illustrated in FIG. 4. The second binder reel 42 is supported on a binder shaft 44 which is in turn supported on the frame 23. The second binder shaft 44 has an upstream end 45 rotatably supported on the frame 23 and an opposite downstream free end 46. As with the first binder head 26, the second binder 16 is passed over the free end 46 of the binder shaft 44 so that it can be wound around the buffer tubes 13. The upstream end 45 of the second binder shaft 44 is advantageously supported on a pair of bearings 47. The second binder shaft 44 is driven by a drive belt 50 and drive motor 51. A brake 52 is also provided for braking the rotation of the binder shaft 44.

Figure 5:
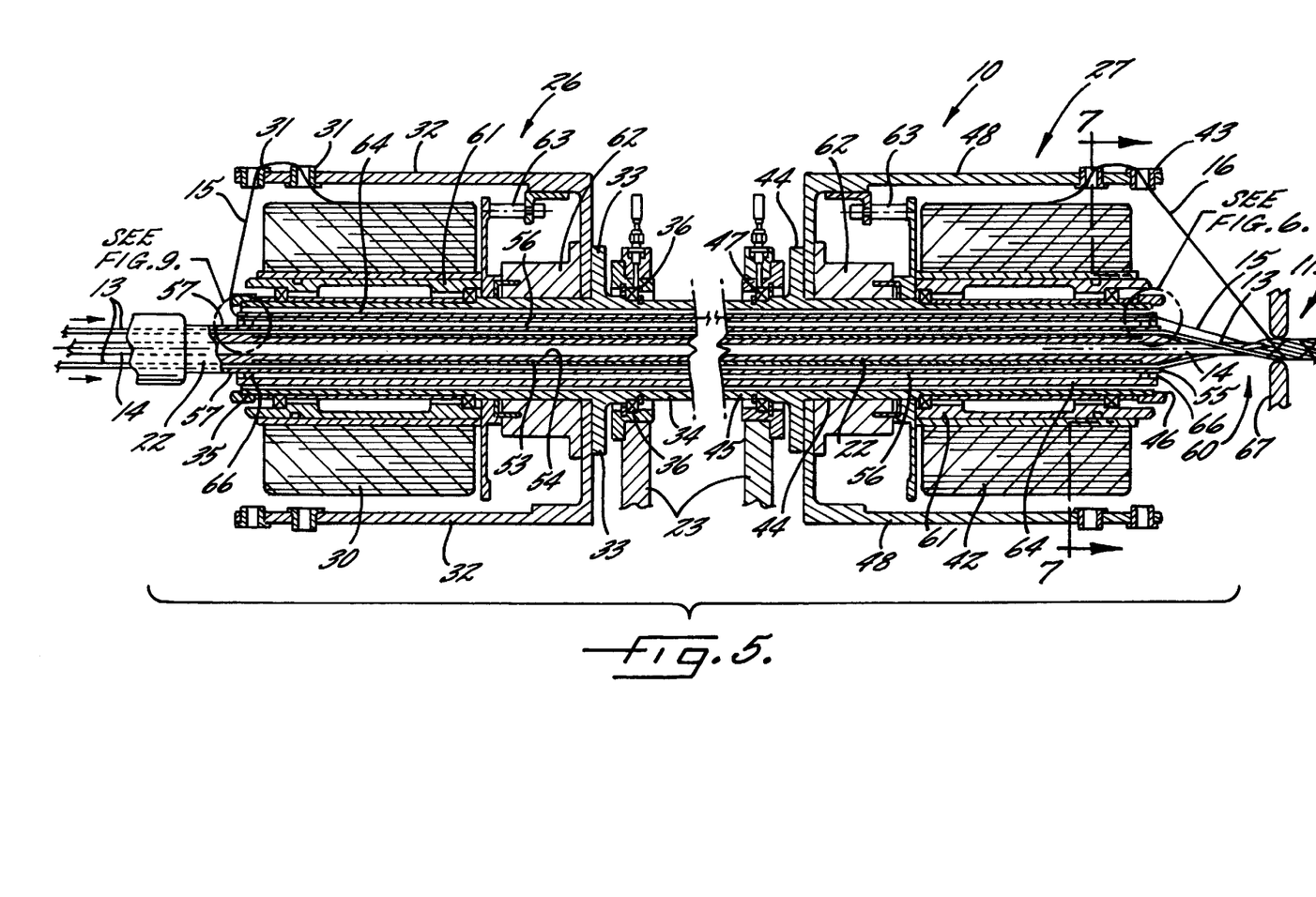
FIG. 5 is an enlarged sectional view of the first and second binder heads.
Figure 10:
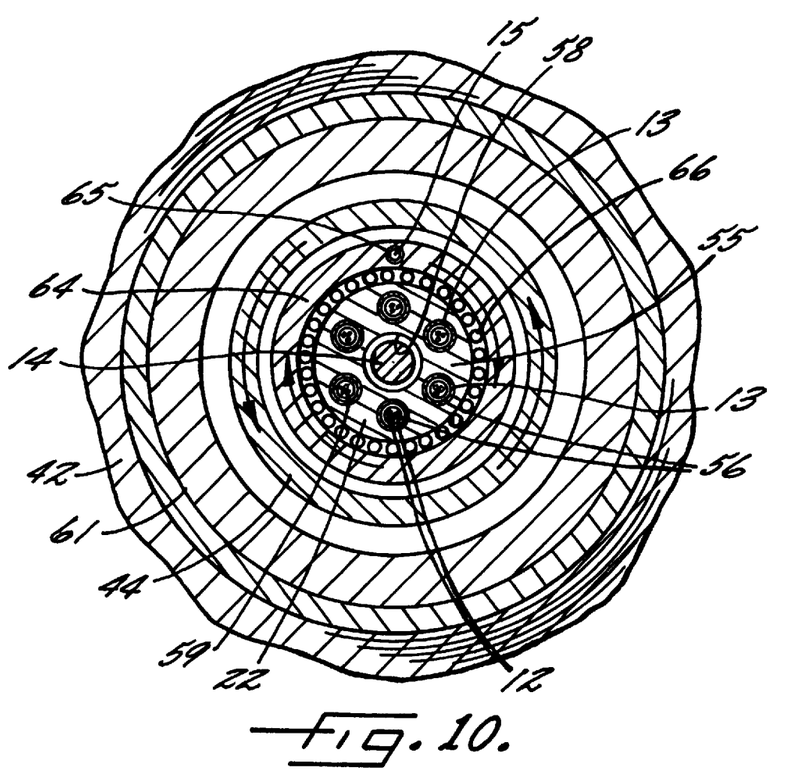
FIG. 10 is an enlarged sectional view of the apparatus taken along lines 7—7 of FIG. 5.

The oscillator shaft 22 extends completely through both of the first and second binder heads 26, 27 as can be seen in FIG. 5. The oscillator shaft 22 includes a central hub 53 defining a bore 54 through which the central reinforcing member 14 is advanced. Affixed to the downstream end of the central hub 53 is a lay plate 55. In conventional fashion, the lay plate 55 includes a central opening 58 for allowing the central reinforcing member 14 to advance therethrough and a plurality of openings 59 arranged in a radially spaced array therearound as can be seen in FIG. 10. The openings 59 define conduits for guiding the buffer tubes 13. In particular, the conduits may be formed by tubular members 56 received in the openings 59 of the lay plate 55. Although tubular members 56 are illustrated, it will be appreciated that other conduit forms could be used, including elongated bores formed in the wall of the central hub 53.

Affixed to the opposite upstream end of the oscillator shaft 22 is an upstream end member 57 having openings corresponding to the openings in the lay plate 55 and the upstream ends of the tubular members 56 are engaged in the radially spaced openings of the upstream end member 57. Although the oscillator shaft 22 according to the present invention has been described and illustrated with a separate lay plate 55 and upstream end member 57, it will be appreciated by one of ordinary skill in the art that the function of these items could be attained by enlarging the ends of the central hub 53 to have a corresponding shape.

Accordingly, the lay plate 55 directs the buffer tubes 13 in respective converging directions towards the central reinforcing member 14. The buffer tubes 13 come together around the central reinforcing member 14 at a common closing point 60. The first and second binders 15, 16 are wound around the buffer tubes 13 immediately after the closing point 60 to bind the buffer tubes to each other and to the central reinforcing member 14. It will be appreciated that the oscillating movement of the oscillator shaft 22 and the lay plate 55 cause the buffer tubes 13 to be arranged around the central reinforcing member 14 in an oscillating lay. It is important that the first and second binders 15, 16 are wound around the buffer tubes 13 immediately downstream of the closing point 60 so that the oscillating lay is captured and the buffer tubes are not allowed to straighten. A closing die 67 ensures that the buffer tubes 13 and binders 15, 16 are tightly bound together.

The structure of the binder heads 26, 27 can also be seen in more detail in FIG. 5. Specifically, each of the binder heads includes a freely rotatable spool 61 on which the respective binder reels 30, 42 are mounted. The spools 61 are freely rotatable on the binder shafts 33, 44 so that the binders 15, 16 are easily paid off from the binder reels. Electromagnetic brakes 62 are provided on the spools 61 for binder tension control, and sensors 63 are mounted inside the binder head housings 32, 48 to sense the position and speed of the spools 61.

Located between the oscillator shaft 22 and the binder shafts 33, 44 is a rotatable sleeve 64 for advancing the first binder 15 through the binder heads 26, 27 to a position just downstream of the closing point 60 so that the binder 15 may be wound around the buffer tubes 13. At least one longitudinally extending passageway 65 is associated with the rotatable sleeve 64 and which in a preferred embodiment comprises a tubular member adhered to the outer surface of the rotatable sleeve. Although not illustrated, a second passageway may be provided on the rotatable sleeve 64 opposite the first passageway 65 to balance the sleeve.

Figure 9:
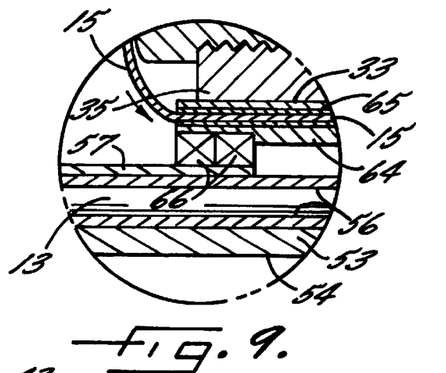
FIG. 9 is a greatly enlarged detailed view of the area encircled in FIG. 5.

The rotatable sleeve 64 is rotated in the same direction and at the same speed as the first binder shaft 33 so that the first binder 15 can be advanced through the binder guides 31 and into an upstream entrance end of the passageway 65. In the preferred embodiment illustrated in FIGS. 5 and 9, the upstream end of the rotatable sleeve 65 is fixedly mounted within the first binder shaft 33. Alternatively, the first binder shaft 33 and rotatable sleeve 64 could be formed from the same piece of material inasmuch as these two elements always rotate together and at the same speed.

Figure 6:
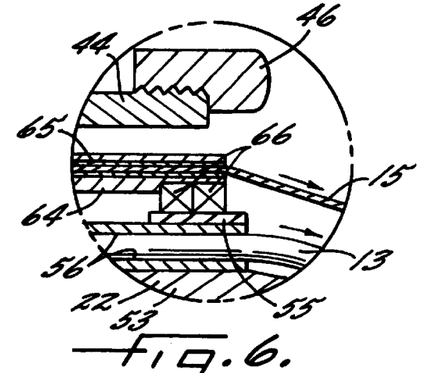
FIG. 6 is a greatly enlarged detailed view of the area encircled in FIG. 5.
Figure 7:
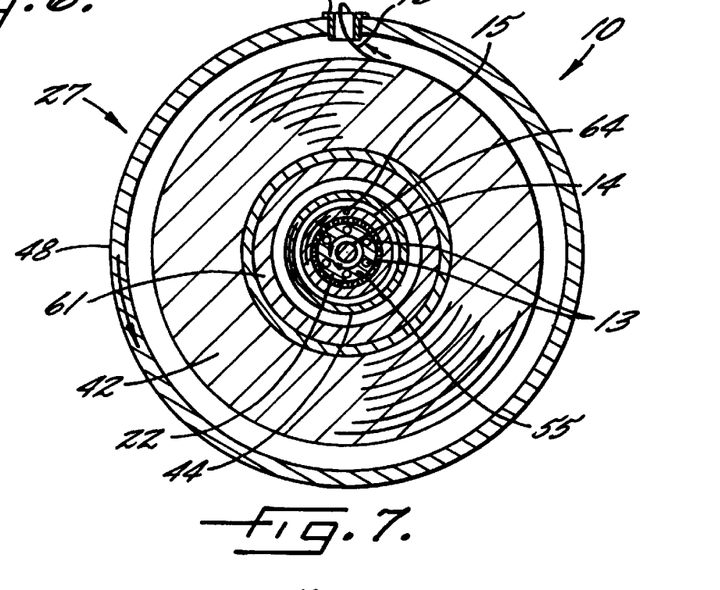
FIG. 7 is a sectional view of the apparatus taken along lines 7—7 of FIG. 5.

The downstream end of the rotatable sleeve 64, however, is freely rotatable within the second binder head 27. As can be best seen in FIG. 6, a space is provided between the rotatable sleeve 64 and the inner diameter of the second binder shaft 44. The rotatable sleeve 64 is rotatably connected at either end to the oscillator shaft 22 and small, rolling element bearings 66 are provided between the rotatable sleeve and oscillator shaft. Accordingly, as can be seen in the cross-sections of FIGS. 7 and 10, the binder shaft 44 of the second binder head 27 rotates in one direction while the rotatable sleeve 64 positioned just inside the binder shaft rotates in the opposite direction and the oscillator shaft 22 located at the center of the apparatus alternatingly rotates in opposite directions in an oscillating fashion. The first binder 15 is directed from an exit end of the passageway 65 to the closing die 67 where it is wound around the buffer tubes 13.

Thus, a binding apparatus 10 is provided where a locking capstan 18 can be positioned just downstream of the closing point 60 with no intermediate apparatus therebetween (with the exception of the closing die 67). This is highly advantageous because it decreases the length of fiber optic cable over which cable rocking can occur. In addition, the binding apparatus 10 according to the present invention provides a pair of oppositely facing binder heads such that one or more replacement binder reels 30A, 30B, 42A, 42B can be easily advanced into the binder heads 26, 27, as can be seen in FIG. 1. The replacement binder reels 30A, 30B, 42A, 42B are positioned adjacent to the free ends of the binder heads 26, 27 so that the core of an expended binder reel can be cut away, and the replacement reel can be easily advanced over the fiber optic cable to the position in the binder head formerly occupied by the expended reel. Both of these advantages are advantageously achieved in the same device, thus providing greatly increased productivity and efficiency.

Figure 8:
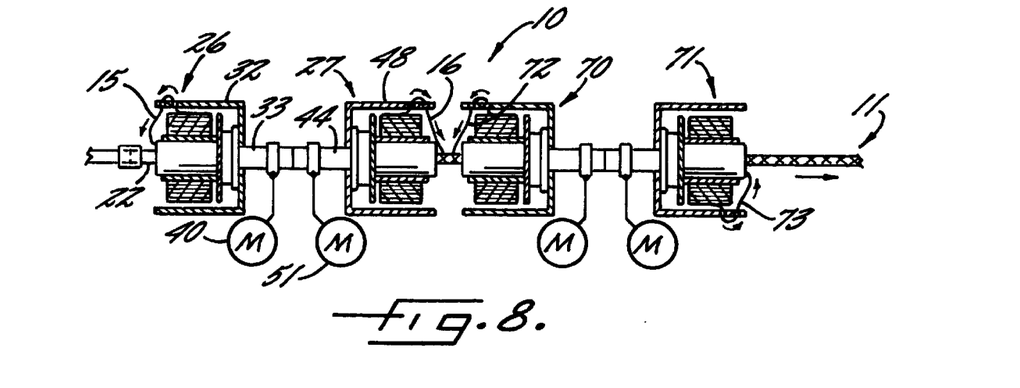
FIG. 8 is a schematic view of a fiber optic cable manufacturing apparatus according to an alternative embodiment of the invention.

Another preferred embodiment of the invention is illustrated in FIG. 8 and includes first and second binder heads 26, 27 of the type described above. Just downstream of the first and second binder heads 26, 27 are third and fourth binder heads 70, 71 having a structure generally corresponding to that of the first and second binder heads to wind third and fourth binders 72, 73 around the buffer tubes 13. A rotatable sleeve (not shown) having a structure corresponding to the rotatable sleeve 64 extending through the first and second binder heads 26, 27 is provided for guiding the fourth binder 73 in an upstream direction through the third and fourth binder heads 70, 71 to a position between the second and third binder heads. As with the embodiment above, the closing point for the buffer tubes 13 is just downstream of the second binder head 27 and all four binders 15, 16, 72, 73 are wound around the buffer tubes 13 at substantially the same position. It is advantageous to wind the binders 15, 16, 72, 73 at a common position so that proper sequencing of the binders can be attained.

The third and fourth binder heads 70, 71 are spaced a predetermined distance apart from the first and second binder heads 26, 27 so that a predetermined binder pattern can be applied to the buffer tubes 13. In particular, the first and third binder heads 26, 70 rotate in a first direction and form two helical paths of binder 15, 72 extending around the buffer tubes 13 which are parallel and evenly spaced. Similarly, the second and fourth binder heads 27, 71 rotate in the opposite direction and form two helical paths of binder 16, 73 extending around the buffer tubes 13 which are generally parallel and evenly spaced. A fiber optic cable 11 of this type is illustrated in FIG. 2 and provides additional binding strength and stability. Alternatively, the lay length of the binders 15, 16, 72, 73 can be doubled without decreasing binder stability so that the rotating speed of the binder heads 26, 27, 70, 71 can be decreased. Decreasing the binder head rotation speed allows faster line speeds and reduces the frequency at which the binder reels must be replaced.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for manufacturing fiber optic cable having a plurality of optical fiber buffer tubes bound by a binder, said apparatus comprising:

a frame;

an oscillator shaft supported on said frame for oscillating movement about a longitudinal axis;

a lay plate carried by said oscillator shaft for oscillating movement with said oscillator shaft, said lay plate having a plurality of openings for receiving and guiding longitudinally advancing buffer tubes into an oscillating lay about said axis;

a first binder head concentric with and surrounding said oscillator shaft, said binder head being mounted for rotation about said axis for winding a first binder around the buffer tubes; and a second binder head longitudinally offset from said first binder head and concentric with and surrounding said oscillator shaft, said second binder head being mounted for rotation about said axis for winding a second binder around the buffer tubes.

2. An apparatus as defined in claim 1, wherein said oscillator shaft has an upstream end supported on said frame and a downstream end, and said lay plate is mounted to said downstream end of said shaft and positioned closely adjacent said second binder head.

3. An apparatus as defined in claim 2 further comprising a rotatable sleeve surrounding said oscillator shaft and extending longitudinally through said first and second binder heads, and a longitudinally extending binder passageway associated with said rotatable sleeve, said binder passageway having an entrance end adjacent said first binder head for receiving the first binder therefrom and an exit end adjacent said second binder head for passage of the first binder during winding thereof onto the buffer tubes.

4. An apparatus as defined in claim 3 wherein said binder passageway comprises a tubular member adhered to the radially outer surface of said sleeve.

5. An apparatus as defined in claim 3 wherein said rotatable sleeve has one end fixedly mounted within said first binder head for rotation therewith and an opposite end freely rotatable within said second binder head.

6. An apparatus as defined in claim 5 wherein said fixedly mounted end of said rotatable sleeve is rotatably connected to said oscillator shaft.

7. An apparatus as defined in claim 6 further comprising a rolling element bearing between said fixedly mounted end of said rotatable sleeve and said oscillator shaft.

8. An apparatus as defined in claim 5 wherein said opposite end of said rotatable sleeve is rotatably connected to said oscillator shaft.

9. An apparatus as defined in claim 8 further comprising a rolling element bearing between said opposite end of said rotatable sleeve and said oscillator shaft.

10. An apparatus as defined in claim 1 further comprising a plurality of conduits associated with said oscillator shaft and passing through said first and second binder heads for guiding the respective longitudinally advancing buffer tubes.

11. An apparatus as defined in claim 10 further comprising an upstream end member positioned at the upstream end of said oscillator shaft closely adjacent said first binder head and upstream of said lay plate and having a plurality of openings corresponding to said openings of said lay plate, and wherein said conduits are engaged at one end in said openings of said lay plate and at the other end in said openings of said upstream end member.

12. An apparatus as defined in claim 1 wherein said oscillator shaft further comprises a central hub defining a bore through which a central reinforcing member for the fiber optic cable is advanced.

13. An apparatus for manufacturing fiber optic cable having a plurality of optical fiber buffer tubes bound by a binder, said apparatus comprising:

a frame;

an oscillator shaft supported on said frame for oscillating movement about a longitudinal axis;

a lay plate carried by said oscillator shaft for oscillating movement with said oscillator shaft, said lay plate having a plurality of openings for receiving and guiding longitudinally advancing buffer tubes into an oscillating lay about said axis;

a first binder head for winding a first binder around the buffer tubes comprising;
   a binder shaft concentric with and surrounding said oscillator shaft and having a downstream end and an upstream end;
   a binder reel supported on said binder shaft and having a supply of binder wound thereon; and
   a binder guide supported on said binder shaft adjacent said upstream end of said binder shaft for paying out the binder from said binder reel; and a second binder head longitudinally offset from said first binder head for winding a second binder around the buffer tubes comprising;
   a binder shaft concentric with and surrounding said oscillator shaft and having an upstream end and a downstream end;
   a binder reel supported on said binder shaft and having a supply of binder wound thereon; and
   a binder guide supported on said binder shaft adjacent said downstream end of said binder shaft for paying out binder from said binder reel.

14. An apparatus as defined in claim 13, wherein said oscillator shaft has an upstream end supported on said frame and a downstream end, and said lay plate is mounted to said downstream end of said shaft and positioned closely adjacent said second binder head.

15. An apparatus as defined in claim 14 further comprising a rotatable sleeve surrounding said oscillator shaft and extending longitudinally through said first and second binder heads, and a longitudinally extending binder passageway associated with said rotatable sleeve, said binder passageway having an entrance end adjacent said first binder head for receiving the first binder therefrom and an exit end adjacent said second binder head for passage of the first binder during winding thereof onto the buffer tubes.

16. An apparatus for manufacturing fiber optic cable having a plurality of optical fiber buffer tubes bound by a binder, said apparatus comprising:

a frame positioned for receiving a plurality of longitudinally advancing buffer tubes from a supply source;

a lay plate having a plurality of openings for receiving the respective longitudinally advancing buffer tubes and for guidingly converging the buffer tubes toward a closing point located downstream of said lay plate; and first and second binder heads located upstream of the closing point and arranged for receiving the advancing buffer tubes therethrough in their path of travel to the closing point;

said first binder head comprising;
   a hollow binder shaft having a downstream end rotatably supported on said frame and an upstream free end;
   a binder reel supported on said binder shaft and having a supply of binder wound thereon; and
   a binder guide supported on said shaft adjacent said upstream free end thereof for paying out binder from said reel; and said second binder head being downstream of said first binder head and comprising;

a hollow binder shaft having an upstream end rotatably supported on said frame and a downstream free end;

a binder reel supported on said binder shaft and having a supply of binder wound thereon; and a binder guide supported on said binder shaft adjacent said downstream end thereof for paying out binder from said reel.

17. An apparatus as defined in claim 16 further comprising a locking capstan positioned downstream of said lay plate and closely adjacent to said closing point for preventing rotation of the fiber optic cable about its axis.

18. An apparatus as defined in claim 16 further comprising a rotatable sleeve extending longitudinally through said shafts of said first and second binder heads, and a longitudinally extending binder passageway associated with said rotatable sleeve, said binder passageway having an entrance end adjacent said first binder head for receiving the first binder therefrom and an exit end adjacent said second binder head for passage of the first binder during winding thereof onto buffer tubes.

19. An apparatus as defined in claim 16 further comprising:

a third binder head immediately downstream of said second binder head for winding a binder around the buffer tubes; and a fourth binder head downstream of said third binder head for winding a binder around the buffer tubes; and a locking capstan downstream of the binder heads for preventing the fiber optic cable from rotating about its own axis.

20. An apparatus for manufacturing fiber optic cable having a plurality of optical fiber buffer tubes bound by a binder, said apparatus comprising:

a first binder head defining a bore through which the buffer tubes are advanced, said first binder head being rotatably mounted for winding a first binder around the buffer tubes;

a second binder head downstream of said first binder head and defining a bore through which the buffer tubes are advanced, said second binder head being rotatably mounted for winding a second binder around the buffer tubes;

a third binder head immediately downstream of said second binder head and defining a bore through which the buffer tubes are advanced, said third binder head being rotatably mounted for winding a third binder around the buffer tubes;

a fourth binder head downstream of said third binder head and defining a bore through which the buffer tubes are advanced, said fourth binder head being rotatably mounted for winding a fourth binder around the buffer tubes; and a locking capstan downstream of the binder heads for preventing the fiber optic cable from rotating about its own axis.

21. An apparatus as defined in claim 20 including means associated with each of said first, second, third and fourth binder heads for directing the respective binders thereof to a common closing point where they are wound around the buffer tubes.

22. An apparatus as defined in claim 21 wherein said common closing point is located between said second and third binder heads.

23. An apparatus as defined in claim 21 wherein two of said binder heads rotate in one direction and are spaced a predetermined distance apart to define two helically extending paths around the buffer tubes which are substantially parallel and equally spaced.

24. An apparatus as defined in claim 23 wherein the other two of said binder heads rotate in the opposite direction and are spaced a predetermined distance to define two helically extending paths around the buffer tubes which are substantially parallel and equally spaced.

25. An apparatus for manufacturing fiber optic cable having a plurality of optical fiber buffer tubes disposed around a central reinforcing member, said oscillator apparatus comprising:

a frame;

a pair of binder heads for winding binder around the buffer tubes;

an oscillating drive motor;

an elongated oscillator shaft in operative connection with said drive motor, said oscillator shaft defining a bore through which the central reinforcing member is advanced in a machine direction, and said oscillator shaft extending through both of the binder heads and having an upstream end supported on said frame adjacent an upstream one of the binder heads and a downstream end adjacent the downstream one of the binder heads; and a lay plate supported on said downstream end of said oscillator shaft and defining a central opening in alignment with said bore and a plurality of radially spaced openings through which the buffer tubes are advanced for laying the buffer tubes in an oscillating lay around the central reinforcing member.

26. An apparatus as defined in claim 25 further comprising a plurality of conduits associated with said oscillator shaft and passing through the binder heads for guiding the respective advancing buffer tubes.

27. An apparatus as defined in claim 26 wherein said conduits comprise tubular members.

28. A winding apparatus for winding a binder around a plurality of fiber optic buffer tubes, said apparatus comprising:

a hollow binder shaft through which the buffer tubes are longitudinally advanced, said shaft having a downstream end and an upstream end;

a binder reel supported on said shaft and having a supply of binder wound thereon;

a binder guide supported on said shaft adjacent said upstream end thereof for paying out binder from said reel;

a sleeve extending longitudinally through said binder shaft and defining a bore through which the buffer tubes are longitudinally advanced, said sleeve having an upstream end fixedly mounted within said hollow binder shaft for rotation therewith; and at least one longitudinally extending binder passageway associated with said sleeve for guiding binder through said binder shaft and advancing the binder for wound engagement with the buffer tubes.

29. An apparatus as defined in claim 28 wherein said binder passageway further comprises a tubular member adhered to the radially outer surface of said sleeve.

30. An apparatus as defined in claim 28 wherein said binder passageway has an entrance end adjacent said free upstream end of said binder shaft for receiving binder from said binder guide and an exit end downstream from said entrance end for winding the binder around the buffer tubes.

31. An apparatus as defined in claim 28 further comprising a second hollow binder shaft in longitudinal alignment with said first hollow binder shaft, and wherein said sleeve longitudinally extends through both of said binder shafts and rotates within said second binder shaft.

32. An apparatus as defined in claim 28 further comprising an oscillator shaft extending through the bore of said sleeve for guiding the longitudinally advancing buffer tubes into an oscillating lay about a common axis before the binder is wound around the buffer tubes.

33. A method of manufacturing fiber optic cable, said method comprising the steps of:

guiding a plurality of optical fiber buffer tubes into an array spaced about a common axis;

longitudinally advancing the buffer tubes through first and second successively arranged binder heads;

guiding the buffer tubes in respective converging directions towards the common axis to define a closing point while oscillating the buffer tubes around the common axis; and then winding binders from the first and second binder heads around the buffer tubes at a location adjacent the closing point to bind the buffer tubes together.

34. A method as defined in claim 33 further comprising the step of advancing the first binder in the same direction as the buffer tubes while the buffer tubes are advanced through the first and second binder heads.

35. A method as defined in claim 33 further comprising the step of maintaining the buffer tubes in the spaced array while longitudinally advancing the buffer tubes through the first and second binder heads.

36. A method as defined in claim 33 further comprising the step of longitudinally advancing a central reinforcing member through the first and second binder heads between the buffer tubes to the closing point.

37. A method as defined in claim 33 wherein said winding step further comprises winding the first binder in one direction around the buffer tubes and winding the second binder in the opposite direction around the buffer tubes.

38. A method as defined in claim 33 further comprising the steps of winding a third binder around the buffer tubes at a location adjacent the closing point and winding a fourth binder around the buffer tubes at a location adjacent the closing point.

* * * * *

UNITED STATES PATENT AND TRADEMARK OFFICE
CERTIFICATE OF CORRECTION

PATENT NO. : 5,826,419

DATED : October 27, 1998

INVENTOR(S) : Shelander et al.

It is certified that error appears in the above-identified patent and that said Letters Patent is hereby corrected as shown below:

On the title page, item [60]:

In the Related U.S. Application Data, the provisional application date "Feb. 5, 1997" should read --Feb. 5, 1996--.

In the References Cited, U.S. PATENT DOCUMENTS, last line, "Luthhardt" should read --Luthardt--.

Signed and Sealed this

Twenty-third Day of March, 1999

Attest:

Q. TODD DICKINSON

*Attesting Officer*     *Acting Commissioner of Patents and Trademarks*